May 17, 1932. P. P. HORNI ET AL 1,858,298

LIGHT REFLECTING UNIT

Filed Dec. 11, 1929

INVENTORS
Paul P. Horni + Robert M. Sutphen
BY
Knight Bros
ATTORNEYS

Patented May 17, 1932

1,858,298

UNITED STATES PATENT OFFICE

PAUL P. HORNI, AND ROBERT M. SUTPHEN, OF NEWARK, NEW JERSEY; SAID SUTPHEN ASSIGNOR TO SAID HORNI

LIGHT REFLECTING UNIT

Application filed December 11, 1929. Serial No. 413,266.

This invention relates to light reflectors of the autocollimating type, and has for its object the production of light reflecting lenses or buttons that will give a maximum of brilliance of reflected rays over a maximum angularity. Other characteristics of the lens enable it to reflect autocollimetrically, rays of light impinging on its side. A lens of this character possesses many advantages when used for signalling, advertising or the like.

The invention is illustrated in the accompanying drawings, in which

Figure 1 is an axial section of a detached light-reflecting lens constructed according to our invention and without any reflecting coating applied thereto.

Figure 2, an anterior view of the same.

Figure 1:
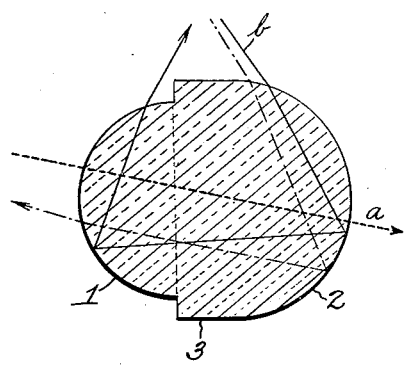
Figure 2:
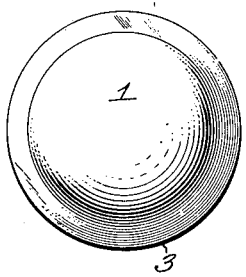
Figure 3:
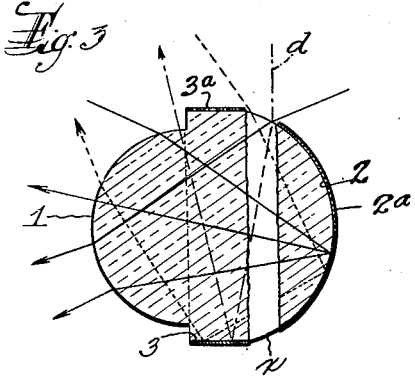
Figure 3 is an axial section of the light-reflecting lens shown in Figures 1 and 2 with light-reflecting coatings applied to certain portions thereof.
Figure 4:
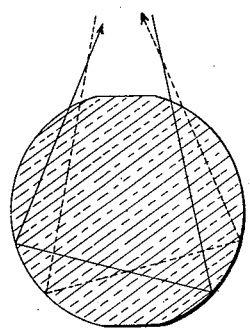
Figure 4 is an intermediate section transverse to the axis.
Figure 5:
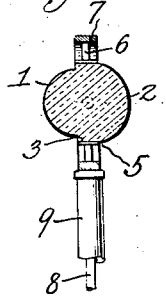
Figure 5 is an axial section of the lens mounted in a preferred form of our improved support, portions of said support being broken away and portions thereof being shown in section.
Figure 6:
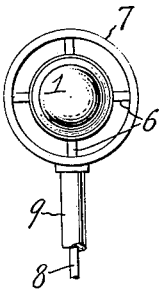
Figure 6 is a front elevation of the lens and support shown in Figure 5.
Figure 7:
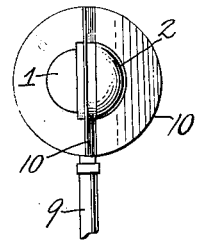
Figure 7 is a side elevation of the lens mounted in a modified form of support provided with wind vanes.

As shown in Figure 1, the lens which is formed of a solid piece of glass, either plain or colored, comprises three principal parts, an anterior hemispherical objective part 1 with a relatively smaller radius of curvature, a posterior hemispherical reflecting part 2 with a relatively larger radius of curvature, and an intermediate cylindrical part 3 with a radius of curvature equal to that of the posterior hemispherical reflecting part 2. The cylinder 3 corresponds in axial length to the distance between the centers of the two hemispheres. This displacement of the centers of the hemispheres is not only for the purpose of giving an intermediate cylindrical connecting portion which has certain useful functions by itself, as explained below, but the said displacement by being accurately proportioned to the diameters of the hemispheres, gives the maximum brilliance of autocollimetry. The combined effects of the posterior hemisphere and the cylindrical extension thereof, are approximately similar to that of a parabolic reflector, and have been found to give an unusual degree of brilliance. The radii are such that a sufficient amount of dispersion is given the rays to give a glare over the full face of the objective. The face of the button then appears as a bright disk when viewed from any point because the impinging rays are reflected in all directions. Thus while there can be no reflected image, great brilliance is produced due to the mirror being at or near the focal sphere. As shown in Figure 3, the intermediate cylindrical part 3 of the lens may be provided with a reflecting coating or band 3a extending over the entire axial length of said part. Preferably, moreover, we apply a part-spherical cap-like reflecting coating 2a to a portion of the outer surface of the posterior hemispherical part 2, leaving an uncoated zone or band x between the reflecting coatings 2a and 3a for the admission of light-rays as hereinafter pointed out. It has been found in practice that there are many uses for a button of this kind that has the additional functions of receiving light through the side and reflecting the same in various directions. Thus, as shown in Figure 1, the ordinary autocollimating function applies generally to rays passing into the lens in the general direction of the heavy dotted arrow, a. A ray such as b entering the objective hemisphere 1 from the side, would be reflected on the interior of the convex surface of the lens, and again reflected from the mirrored convex posterior surface, and if not obstructed, would leave the lens through the side wall of the posterior hemisphere, or as shown by the arrow, the ray may pass in the reverse direction. Other rays entering through the said zone would by reflection and refraction, pass out through the front of the objective and give an approximately right angle ray. In Figures 3 and 4, the paths of various side rays are indicated, of which particular attention is called to ray *d* which enters the side of the posterior hemisphere and after reflection from the opposite cylindrical wall, issues from the side of the anterior hemisphere to give an autocollimetric effect. Other rays might enter at the rear and pass straight through and out at the front. The combined effect of these dispositions of the lens surfaces and the mirrored parts thereof, is to produce a luminosity in a plurality of directions without impairing the collimating effect of the button for rays presented head on. Such a combination lens lends itself very suitably to being mounted in a support such as shown in Figures 5, 6 and 7 which show the lens mounted in a ring support embracing it by its cylindrical middle section leaving both hemispheres accessible to light rays. When so mounted, the lens will glow in a remarkable way in several directions. A preferred mounting is by means of a ring 5 into which the cylindrical portion of the lens fits, spokes 6 extending from the ring 5 and an outer ring 7. The latter may be mounted on a vertical pivot shaft 8 that may turn in a support 9. When thus pivotally mounted, the button can be turned to give a reflecting ray from an adjacent light so as to appear itself to be a light. It may even be rotated to give a novel effect, and as shown in Figure 7, wind vanes 10 provided with a slight curvature may give the lens a whirling motion that could be used for attracting attention for advertising or signalling purposes.

We claim:—

1. A light reflecting lens having a convex hemispherical anterior face, a concave hemispherical posterior face, a cylindrical portion uniting the two hemispheres, the posterior hemisphere and the cylindrical surface being mirrored with parts on the side of the lens left unmirrored to admit light to the interior of the lens from the side.

2. A light reflecting lens according to claim 1, combined with a support attached to the cylindrical portion of the lens, said support being pivotally mounted.

3. A light reflecting lens according to claim 1, combined with a support attached to the cylindrical portion of the lens, said support being pivotally mounted, and having vanes adapted to cause the support to turn in the wind.

4. A light reflecting lens comprising a convex hemispherical anterior face having a relatively small radius of curvature, a concave hemispherical reflecting posterior face having a relatively large radius of curvature, the axial length of the lens being appreciably greater than the sum of the radii of the two hemispheres, the lens between the centers of the hemispheres being provided with a cylindrical form having a radius equal to that of the posterior hemisphere, said posterior hemisphere being provided with a mirrored portion spaced from the cylindrical portion of said lens by an uncovered unmirrored band.

5. A light reflecting lens constructed from an integral mass of homogeneous material and comprising a hemispherical anterior part of relatively smaller radius, a hemispherical posterior part of relatively larger radius, and an intermediate cylindrical part having a radius equal to the relatively larger radius of the hemispherical posterior part, said hemispherical parts having their convex faces presented in opposite directions from said intermediate cylindrical part.

6. A light reflecting lens constructed from an integral mass of homogeneous material and comprising a hemispherical anterior part of relatively smaller radius, a hemispherical posterior part of relatively larger radius, and an intermediate cylindrical part having a radius equal to the relatively larger radius of the hemispherical posterior part, said hemispherical parts having their convex faces presented in opposite directions from said intermediate cylindrical part, said intermediate cylindrical part and a portion of the hemispherical posterior part being mirrored, the mirrored part of said hemispherical posterior part being separated from the mirrored intermediate cylindrical part by an unmirrored spherical zone of the former part.

7. A light reflecting lens constructed from an integral mass of homogeneous material and comprising a hemispherical anterior portion of relatively smaller radius, a hemispherical posterior portion of relatively larger radius, and an intermediate cylindrical portion having a radius substantially equal to the relatively larger radius of the hemispherical posterior portion, said hemispherical portions having their convex faces presented in opposite directions from said intermediate cylindrical portion, and a lens support in engagement with said intermediate cylindrical portion, said anterior and posterior hemispherical portions being arranged to project on opposite sides of said lens support.

8. A light reflecting lens comprising a hemispherical anterior objective portion of relatively smaller radius, a hemispherical posterior reflecting portion of relatively larger radius, and an integrally formed intermediate cylindrical portion having a radius substantially equal to the relatively larger radius of the hemispherical posterior reflecting portion, and lens-supporting means engaging said intermediate cylindrical portion and arranged between the ends of said intermediate cylindrical portion.

9. A light reflecting lens comprising a hemispherical anterior portion of relatively smaller radius, a hemispherical posterior portion of relatively larger radius, and an intermediate cylindrical portion having a radius substantially equal to the relatively larger radius of the hemispherical posterior portion, said hemispherical posterior portion being mirrored over a portion thereof parted from said intermediate cylindrical portion by an unmirrored spherical zone.

10. A light reflecting lens comprising a hemispherical anterior objective portion of relatively smaller radius, a hemispherical posterior portion of relatively larger radius, and a mirrored intermediate cylindrical portion having a radius substantially equal to the relatively larger radius of the hemispherical posterior portion, said hemispherical posterior portion comprising a mirrored spherical zone parted from said intermediate cylindrical portion by an unmirrored spherical zone.

11. The combination with a light reflecting lens constructed according to claim 1, of a support in engagement with the cylindrical portion of said lens.

PAUL P. HORNI.
ROBERT M. SUTPHEN.